United States Patent
Choi et al.

(10) Patent No.: US 11,115,826 B2
(45) Date of Patent: Sep. 7, 2021

(54) METHOD FOR MANAGING NETWORK SLICING RESOURCES IN COMMUNICATION SYSTEM AND APPARATUS FOR THE SAME

(71) Applicant: Electronics and Telecommunications Research Institute, Daejeon (KR)

(72) Inventors: Tae Sang Choi, Sejong-si (KR); Jeong Yun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/233,887

(22) Filed: Dec. 27, 2018

(65) Prior Publication Data

US 2019/0387411 A1 Dec. 19, 2019

(30) Foreign Application Priority Data

Jun. 18, 2018 (KR) .......................... 10-2018-0069504
Aug. 10, 2018 (KR) .......................... 10-2018-0093791
Nov. 16, 2018 (KR) .......................... 10-2018-0142094

(51) Int. Cl.
  *H04W 16/02* (2009.01)
  *H04W 24/02* (2009.01)
  *H04W 16/18* (2009.01)
  *H04W 16/10* (2009.01)

(52) U.S. Cl.
  CPC .......... *H04W 16/02* (2013.01); *H04W 16/10* (2013.01); *H04W 16/18* (2013.01); *H04W 24/02* (2013.01)

(58) Field of Classification Search
  CPC ...... H04W 16/02; H04W 16/10; H04W 24/02
  See application file for complete search history.

(56) References Cited

U.S. PATENT DOCUMENTS

| | | | |
|---|---|---|---|
| 2016/0353465 A1 | 12/2016 | Vrzic et al. | |
| 2017/0141973 A1* | 5/2017 | Vrzic | H04W 24/08 |
| 2017/0289791 A1 | 10/2017 | Yog et al. | |
| 2017/0303259 A1* | 10/2017 | Lee | H04W 12/08 |
| 2017/0332212 A1 | 11/2017 | Gage | |
| 2017/0332226 A1 | 11/2017 | Bharatia | |
| 2017/0332421 A1* | 11/2017 | Sternberg | H04W 12/069 |
| 2017/0367036 A1 | 12/2017 | Chen et al. | |
| 2018/0054765 A1 | 2/2018 | Kim et al. | |
| 2018/0124800 A1* | 5/2018 | Arnold | H04L 5/0035 |
| 2018/0132117 A1* | 5/2018 | Senarath | H04L 43/04 |
| 2018/0132138 A1* | 5/2018 | Senarath | H04W 24/02 |
| 2018/0317133 A1* | 11/2018 | Sciancalepore | H04W 28/24 |
| 2018/0317134 A1* | 11/2018 | Leroux | H04L 41/0806 |
| 2020/0021487 A1* | 1/2020 | Yao | G06F 8/65 |

FOREIGN PATENT DOCUMENTS

WO WO-2018/002239 A1 1/2018

* cited by examiner

*Primary Examiner* — Thomas J Dailey
(74) *Attorney, Agent, or Firm* — Rabin & Berdo, P.C.

(57) ABSTRACT

An operation method of a first device in a communication system supporting network slicing may comprise receiving a first message requesting capacity planning of a network slice from a second device; obtaining information required for the capacity planning; transmitting a second message including the required information to a third device supporting a function of the capacity planning; receiving a third message including a result of performing the capacity planning from the third device; and performing a reallocation operation or a modification operation of the network slice based on the result of performing the capacity planning.

15 Claims, 9 Drawing Sheets

METHOD FOR MANAGING NETWORK SLICING RESOURCES IN COMMUNICATION SYSTEM AND APPARATUS FOR THE SAME

CROSS-REFERENCE TO RELATED APPLICATIONS

This application claims priorities to Korean Patent Applications No. 10-2018-0069504 filed on Jun. 18, 2018, No. 10-2018-0093791 filed on Aug. 10, 2018 and No. 10-2018-0142094 filed on Nov. 16, 2018 in the Korean Intellectual Property Office (KIPO), the entire contents of which are hereby incorporated by reference.

BACKGROUND

1. Technical Field

The present disclosure relates to network slicing technologies, more specifically, to technologies for managing network slicing resources in a communication system.

2. Related Art

The communication system may comprise a core network, a base station (e.g., a macro base station, a small base station, a relay, etc.), and a user equipment (UE). In a communication system supporting the 4G communication technology (e.g., long-term evolution (LTE) technology), the core network includes a mobility management entity (MME), a serving gateway (SGW), a packet data network (PDN) gateway (PGW), and the like. In a communication system supporting the 5G communication technology (e.g., new radio (NR) technology), the core network may include an access and mobility function (AMF), a user plane function (UPF), a session management function (SMF), and the like.

The communications between the base station and the UE may be performed using various radio access technologies (RATs) (e.g., 4G communication technology, 5G communication technology, wireless broadband (WiMax or WiBro) technology, wireless local area network (WLAN) technology, wireless personal area network (WPAN), or the like). The base station may be connected to the core network via a wired backhaul or a wireless backhaul. For example, the base station may transmit data and control information received from the terminal to the core network via the wired backhaul or the wireless backhaul. Also, the base station may receive data and control information from the core network via the wired backhaul or the wireless backhaul.

Meanwhile, a network slicing technology may be applied to the communication system. The purpose of the network slicing technology is to efficiently optimize resources of the communication system to minimize capital expenditure (CAPEX) and operating expenditure (OPEX). To this end, methods for optimal management of network slicing resources in the communication system will be required.

SUMMARY

Accordingly, embodiments of the present disclosure provide a method and an apparatus for optimally managing networking slicing resources.

In order to achieve the objective of the present disclosure, an operation method of a first device in a communication system supporting network slicing may comprise receiving a first message requesting capacity planning of a network slice from a second device; obtaining information required for the capacity planning; transmitting a second message including the required information to a third device supporting a function of the capacity planning; receiving a third message including a result of performing the capacity planning from the third device; and performing a reallocation operation or a modification operation of the network slice based on the result of performing the capacity planning.

The operation method may further comprise checking feasibility for the network slice when the first message is received, wherein a result of checking the feasibility for the network slice is included in the second message.

The operation method may further comprise updating network capacity availability information based on a result of the reallocation operation or the modification operation of the network slice; and transmitting a fourth message including the updated network capacity availability information to the second device.

The network slice may be a network slice instance (NSI) or a network slice subnet instance (NSSI).

The result of performing the capacity planning may include at least one of an indicator requesting reallocation of the NSI, an indicator requesting modification of the NSI, an indicator requesting reallocation of the NSSI, and an indicator requesting modification of the NSSI.

The required information may include at least one of a topology, a capacity, a throughput, a packet loss rate, and a link delay of the network slice.

The first device may be a device operating as a network slice management service provider (NSMS_P), the second device may be a device operating as a network slice management service consumer (NSMS_C), and the third device may be a device operating as a management service provider (MS_P).

Network resources and functions constituting the network slice may be optimized when the capacity planning is performed.

In order to achieve the objective of the present disclosure, a first device in a communication system supporting network slicing may comprise a first element supporting a network slice management slice (NSMS) function, a second element supporting a capacity planning function, and a memory storing at least one instruction executed by the first element and the second element. Also, the at least one instruction may be configured to receive, by the first element, a first message requesting the capacity planning of a network slice from a second device; obtain, by the first element, information required for the capacity planning; transmit, by the second element, a second message including the required information to the second element; perform, by the second element, the capacity planning for the network slice based on the second message; transmit, by the second element, a third message including a result of performing the capacity planning to the first element; and perform, by the first element, reallocation operation(s) or modification operation(s) of the network slice based on the result of performing the capacity planning included in the third message.

The at least one instruction may be further configured to check, by the first element, feasibility for the network slice when the first message is received, wherein a result of checking the feasibility for the network slice is included in the second message.

The at least one instruction may be further configured to update, by the first element, network capacity availability information based on a result of the reallocation operation(s) or the modification operation(s) of the network slice; and transmit, by the first element, a fourth message including the updated network capacity availability information to the second device.

The network slice may be a network slice instance (NSI) or a network slice subnet instance (NSSI).

The result of performing the capacity planning may include at least one of an indicator requesting reallocation of the NSI, an indicator requesting modification of the NSI, an indicator requesting reallocation of the NSSI, and an indicator requesting modification of the NSSI.

The required information may include at least one of a topology, a capacity, a throughput, a packet loss rate, and a link delay of the network slice.

The first device may be a device operating as a network slice management service provider (NSMS_P), and the second device may be a device operating as a network slice management service consumer (NSMS_C).

According to the present disclosure, a network slice management service consumer (NSMS_C) may request an NSMS provider (NSMS_P) to perform a capacity planning procedure, and the NSMS_P may perform the capacity planning procedure with a management service provider (MS_P) according to the request of the NSMS_C. According to the capacity planning procedure, relevant network resources and functions can be created, removed, or modified for optimizing utilization of a network slice (e.g., network slice instance (NSI) or network slice subnet instance (NSSI)). Therefore, efficiency of use of network resources and functions can be optimally improved in the communication system supporting network slicing.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
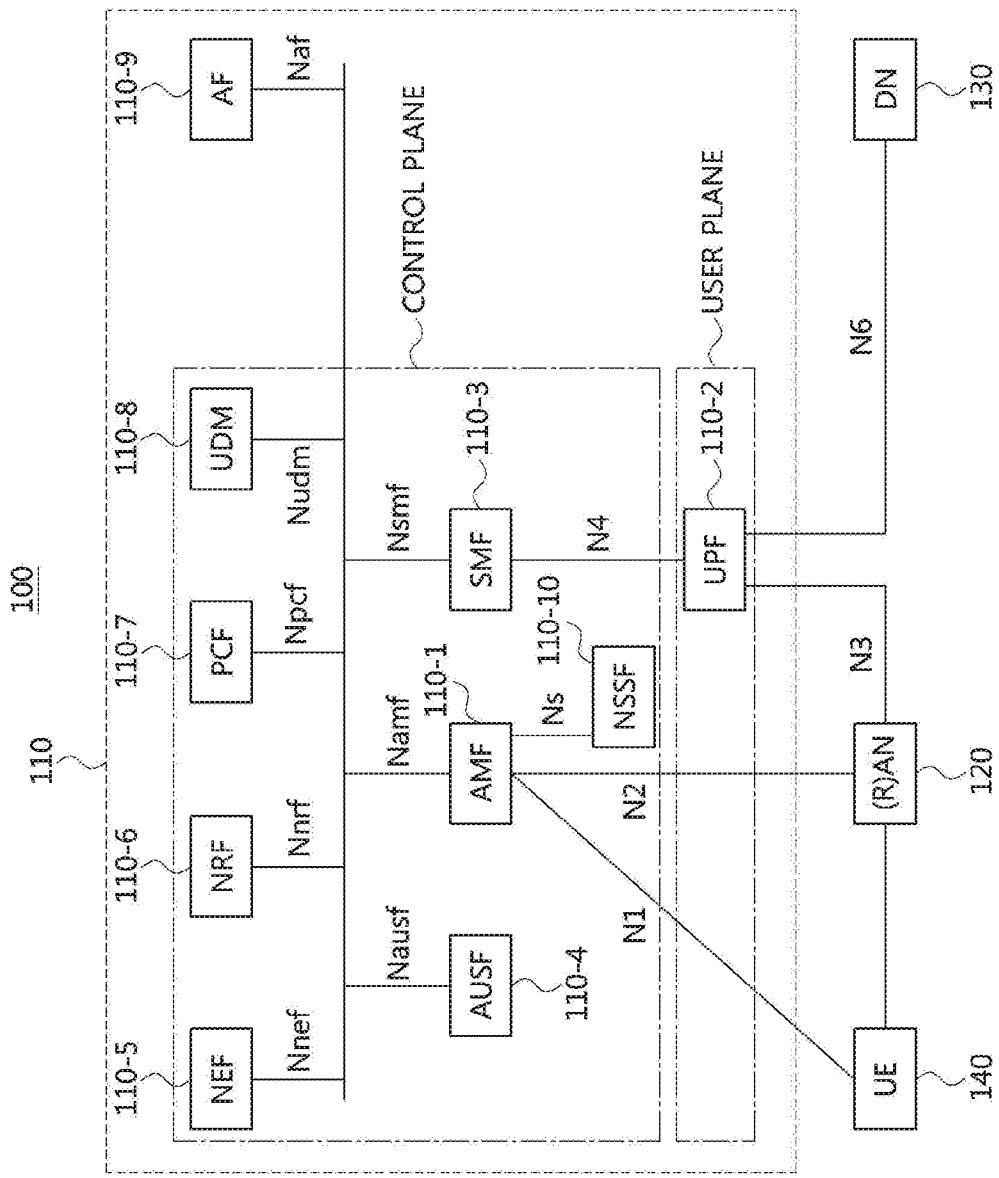
FIG. 1 is a conceptual diagram illustrating a first embodiment of a communication system supporting network slicing.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A communication system to which embodiments according the present disclosure are applied will be described. The communication system to which the embodiments according to the present disclosure are applied is not limited to the following description, and the embodiments according to the present disclosure may be applied to various communication systems. Here, a 'communication system' may be used in the same sense as a 'communication network'.

FIG. 1 is a conceptual diagram illustrating a first embodiment of a communication system supporting network slicing.

Referring to FIG. 1, a communication system 100 may comprise a core network 110, an access network (AN) 120 (e.g., a radio access network (RAN)), a data network (DN) 130, and a user equipment (UE) 140. The core network 110 may include an access and mobility management function (AMF) 110-1, a user plane function (UPF) 110-2, a session management function (SMF) 110-3, an authentication server function (AUSF) 110-4, a network exposure function (NEF) 110-5, a network repository function (NRF) 110-6, a policy control function (PCF) 110-7, a user data management (UDM) 110-8, an application function (AF) 110-9, and a network slice selection function (NSSF) 110-10. Here, the NSSF 110-10 may be used to support selection of a network slice. In the following embodiments, the network slice may indicate a network slice instance (NSI) or a network slice subnet instance (NSSI).

The network functions 110-1 to 110-10 constituting the core network 110 may be performed by one or more physical devices. Alternatively, the network functions 110-1 to 110-10 constituting the core network 110 may be implemented as an instance or a virtual function executed in the physical device.

The core network 110 may be divided into a control plane and a user plane. The control plane may be classified into a common control plane and a slice-specific control plane. The AMF 110-1, the UPF 110-2, the AUSF 110-4, the UDM 110-8, and the NSSF 110-10 may belong to the common control plane. The SMF 110-3, the NEF 110-5, the NRF 110-6, and the PCF 110-7 may belong to the common control plane or the slice-specific control plane. The network functions belonging to the common control plane may be shared by a plurality of NSIs or a plurality of NSSIs. The network function belonging to the slice-specific control plane may be used exclusively for a specific NSI or a specific NSSI.

The AMF 110-1 may perform the following functions.
Termination of a RAN control plane (CP) interface (N2)
Termination of a non-access stratum (NAS) interface (N1), NAS encryption and integrity protection
Registration management
Connection management
Reachability management
Mobility management)
Lawful intercept of AMF events and interfaces of L1 system
Transparent proxy for SM message routing
Access authentication
Access Authorization
Security anchor function (SEA)
Security context management (SCM)

The communications between the AMF 110-1 and the NSSF 110-10 in the communication system 100 may be performed through an Ns interface, and the AMF 110-1 may perform network slicing related operations in cooperation with the NSSF 110-10. For example, an NSI or an NSSI may be selected based on operations between the AMF 110-1 and the NSSF 110-10.

When the network slicing technique is applied to the communication system 100, network resources and functions may be configured as one independent network slice according to required services. Thus, a network operator may configure network resources and functions specific to a service or a user as a network slice, and may provide the network slice to the user who has requested the service. Also, software defined networking (SDN)/network function virtualization (NFV) technologies may be applied to the communication system 100, so that network resources and functions can be virtualized.

Meanwhile, a communication node included in the communication system 100 illustrated in FIG. 1 (e.g., a device that performs a network function shown in FIG. 1) may be configured as follows.

Figure 2:
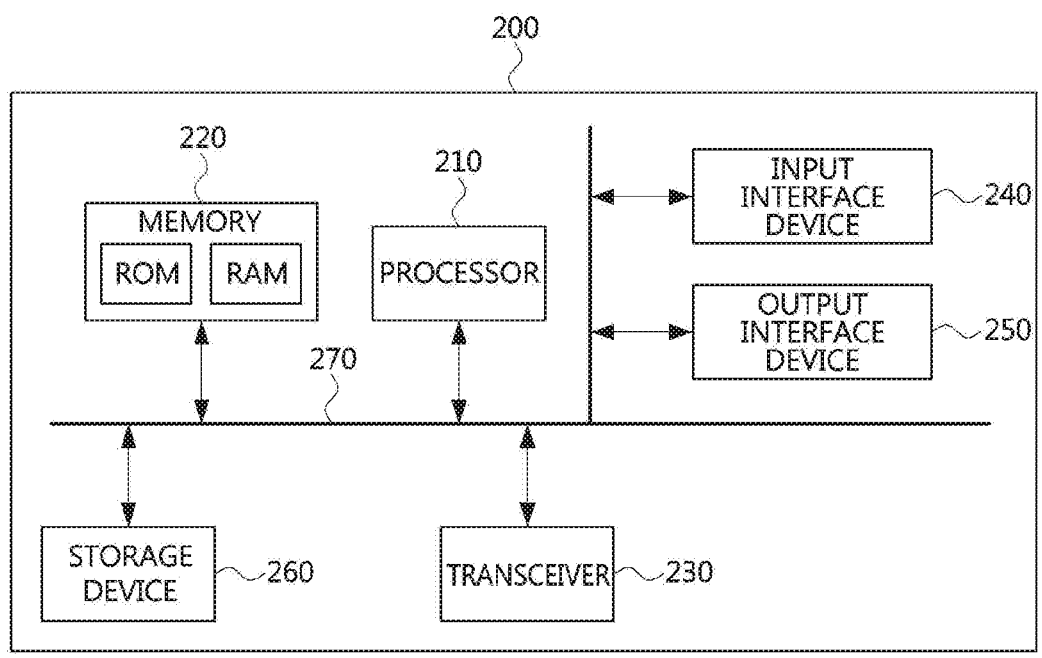
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Next, methods for managing network slicing resources in the communication system will be described. Here, even when a method (e.g., transmission or reception of a signal) to be performed in a first communication node among communication nodes is described, a corresponding second communication node may perform a method (e.g., reception or transmission of the signal) corresponding to the method performed in the first communication node. That is, when an operation of a UE is described, a corresponding base station may perform an operation corresponding to the operation of the UE. Conversely, when an operation of the base station is described, the corresponding UE may perform an operation corresponding to the operation of the base station.

Figure 3:
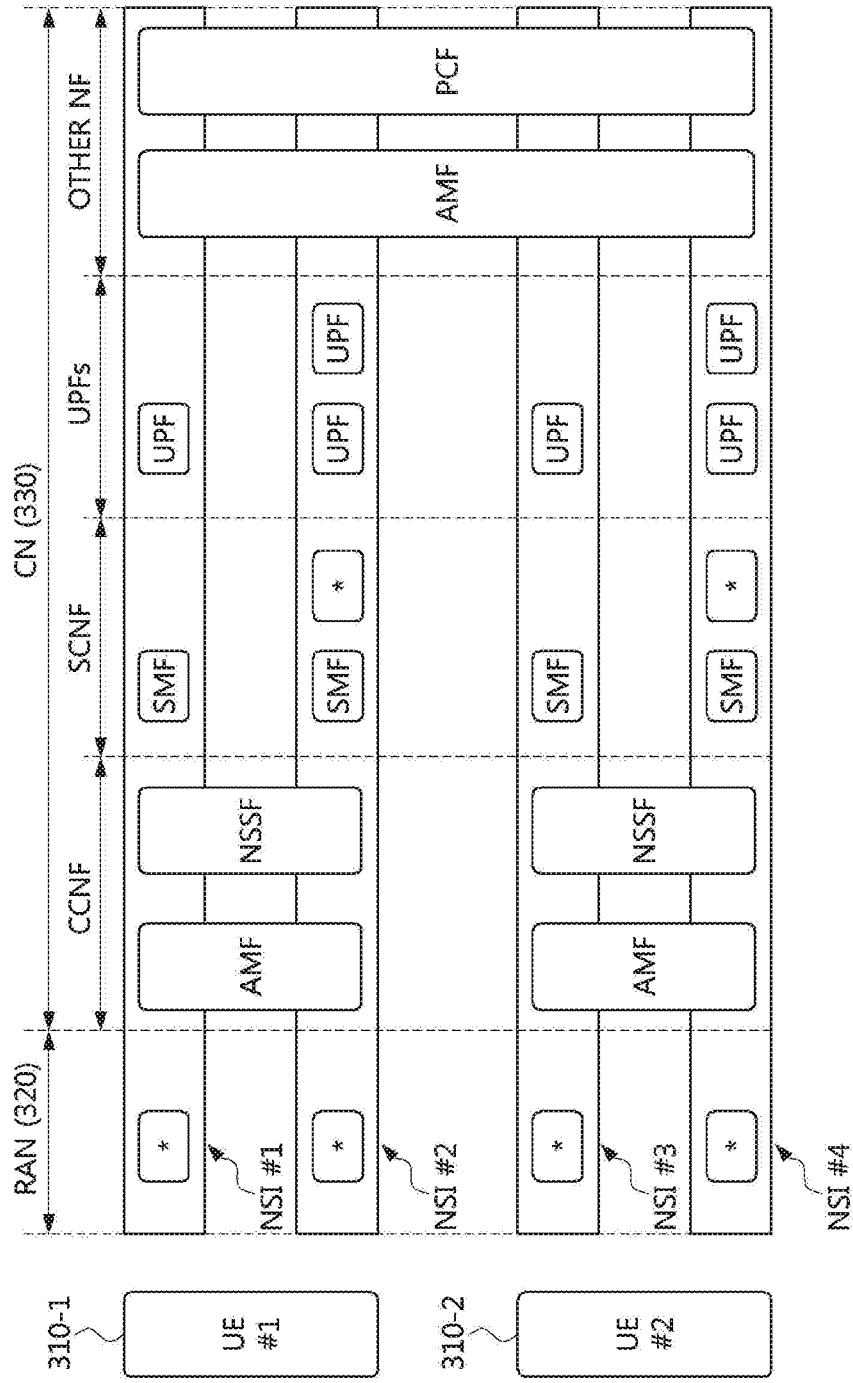
FIG. 3 is a conceptual diagram illustrating a first embodiment of an NSI in a communication system.

FIG. 3 is a conceptual diagram illustrating a first embodiment of an NSI in a communication system.

Referring to FIG. 3, a network slice may be a logical network composed of network resources and functions necessary for providing a specific network performance/characteristic to a user. The network slice may be located in a RAN 320 and a core network (CN) 330. An NSI may be a collection of network resources and functions that provide an intended network slice service according to a template.

A plurality of NSIs may be assigned to each of UEs 310-1 and 320-2. For example, The NSI #1 and the NSI #2 may be assigned to the UE #1 310-1, and the NSI #3 and the NSI #4 may be assigned to the UE #2 310-2. The NSIs #1 and #3 may be configured to provide enhanced mobile broadband (eMBB) services, and the NSIs #2 and #4 may be configured to provide Internet of things (IoT) services. The NSIs #1 to #4 may be configured in the RAN 320 and the CN 330, and each of the NSIs #1 to #4 may include a plurality of NSSIs.

The NSI #1 may be comprised of a RAN slice (e.g., network resources and functions constituting the RAN 320) and a CN slice (e.g., network resources and functions constituting the CN 330). The CN slice may include a common control network function (CCNF), a slice-specific control network function (SCNF), user plane functions (UPFs), and other network functions (NFs). Each of the NSIs #1 to #4 may include instances that support one or more network functions to provide the requested service. An instance that supports a network function may be referred to as a network function instance (NFI).

Each of the UEs 310-1 and 310-2 may access a plurality of NSIs via one RAN 320. In this case, the NSIs #1 and #2 may share some functions (e.g., AMF and NSSF) of the control plane, and the NSIs #3 and #4 may share some functions (e.g., AMF and NSSF) of the control plane. The function of the control plane shared by the NSIs assigned to one UE (e.g., the UE 310-1 or the UE 310-2) may be referred to as a CCNF. The AMF and NSSF included in the CCNF may be shared by one or more NSIs according to a policy of the network operator.

The NSSF may be a network function having NSI topology information for a public land mobile network (PLMN). For example, the NSSF may be an entry point capable of verifying availability of a set of active NSI (s) corresponding to a registration area and accessing a specific NSI. Also, in order to select a target NSI based on at least one of a serving mobile virtual network operator (MVNO), an over-the-top (OTT) provider, a location of the UE, and a time window, the NSSF may support a slice-level service mapping operation for single-network slice selection assistance information (S-NSSAI).

Here, the NSI may be selected from an NSI pool for a specific S-NSSAI for load balancing and redundancy. Slice-level control rules may be configured by the network operator. Further, the NSSF may support a statistic collection function for slice selections for a management system of a serving PLMN. The following parameters may be considered in the operation between the NSSF and the AMF.

Input parameters of the NSSF may include an accepted S-NSSAI. Also, the input parameters of the NSSF may include at least one of a past NSI list associated with the UE (e.g., UE 310-1 or 310-2) and a serving registration area of the UE (e.g., UE 310-1 or 310-2).

Output parameters of the NSSF may include information on the NSI corresponding to the accepted S-NSSAI (e.g., NSI identifier (ID)). Here, the NSI may be a newly selected NSI based on the accepted S-NSSAI. Also, the output parameters of the NSSF may include at least one of an Internet protocol (IP) address or a fully-qualified domain name (FQDN) of a new serving AMF, and an IP address or a FQDN of a serving NRF selected for the NSI.

Also, the PLMN may include an NSI and an NRF provisioned for discovery and selection of network functions. The input parameters of the NSSF may include logical network identifiers as well as types of network functions so that the NRF can support discovery and selection operations of network functions with or without network slicing. The logical network identifier may indicate the NSI ID or the serving PLMN.

Figure 4:
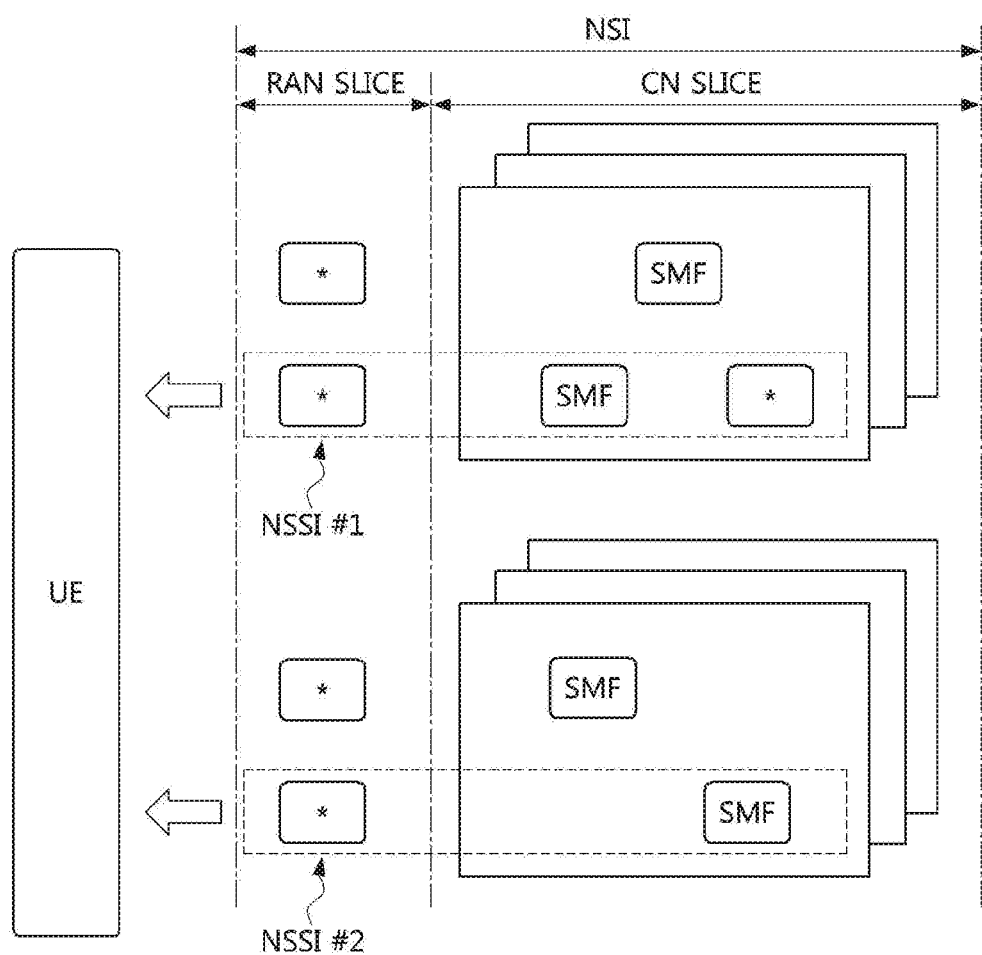
FIG. 4 is a conceptual diagram illustrating a first embodiment of an NSSI in a communication system.

FIG. 4 is a conceptual diagram illustrating a first embodiment of an NSSI in a communication system.

Referring to FIG. 4, one or more NSIs may be selected among NSIs to provide a service required by a UE, and the selected one or more NSIs may be assigned to the UE. For example, a plurality of NSIs for a UE may be configured in the communication system. Within an NSI there may be one or more NFIs that support the same network function. When there are a plurality of NFIs supporting the same network function in the NSI, one of the plurality of NFIs may be selected.

One NSI may be configured to provide one or more services and may be assigned to one or more UEs. The NSI may be a network operator's service-specific resource and function group. The NSI may comprise a plurality of NSSIs, which may be a collection of network resources and functions for providing the services required by the UE.

Figure 5:
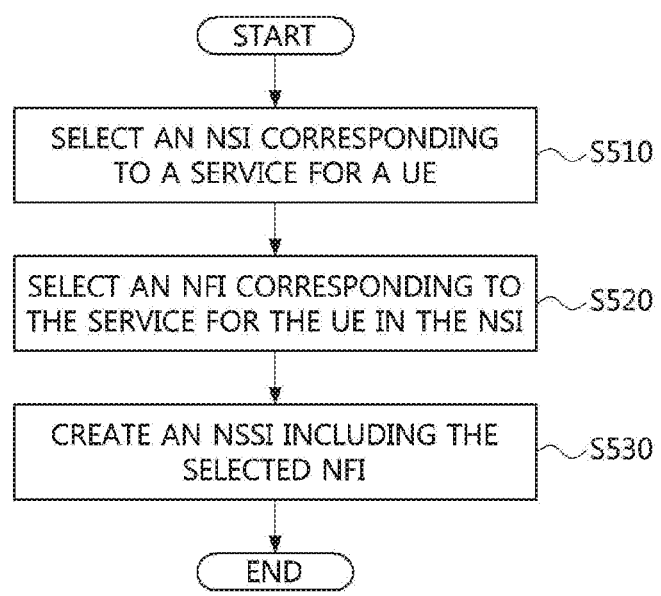
FIG. 5 is a flow chart illustrating a first embodiment of a method of generating an NSSI in a communication system.

FIG. 5 is a flow chart illustrating a first embodiment of a method of generating an NSSI in a communication system.

Referring to FIG. 5, a communication node supporting the NSSF shown in FIG. 1 may select one or more NSIs to provide a service required by the UE among the NSIs defined in the communication system (S510). For example, the communication node may select one or more NSIs based on an NSSAI. In addition, the communication node may select one or more NSIs based on at least one of the previous NSI assigned to the UE and the serving registration area of the UE. When the one or more NSIs are selected, the communication node may output IDs of the selected one or more NSIs, and the addresses of the AMF and the NRF according to the selected one or more NSIs.

The communication node may select one or more NFIs to provide the service required by the UE within the selected NSI (S520). The one or more NFI may be selected based on a logical network identifier (e.g., NSI ID or PLMN ID) and a type of network function. Also, the one or more NFIs may be selected in consideration of a policy of the network operator. The policy of the network operator may include load balancing, resource optimization, energy efficiency, traffic optimization, and the like. For example, when there are two SMFs in the NSI, the communication node may select an SMF that provides a relatively high quality of service (QoS) among the two SMFs. Alternatively, the communication node may select either the SMF corresponding to tariff of the UE or the SMF corresponding to the serving registration area of the UE from among the two SMFs.

The communication node may create an NSSI consisting of the selected one or more NFIs and may assign the NSSI to the UE (S530). The steps S510 to S530 described above may be performed by one or more communication nodes.

Figure 6:
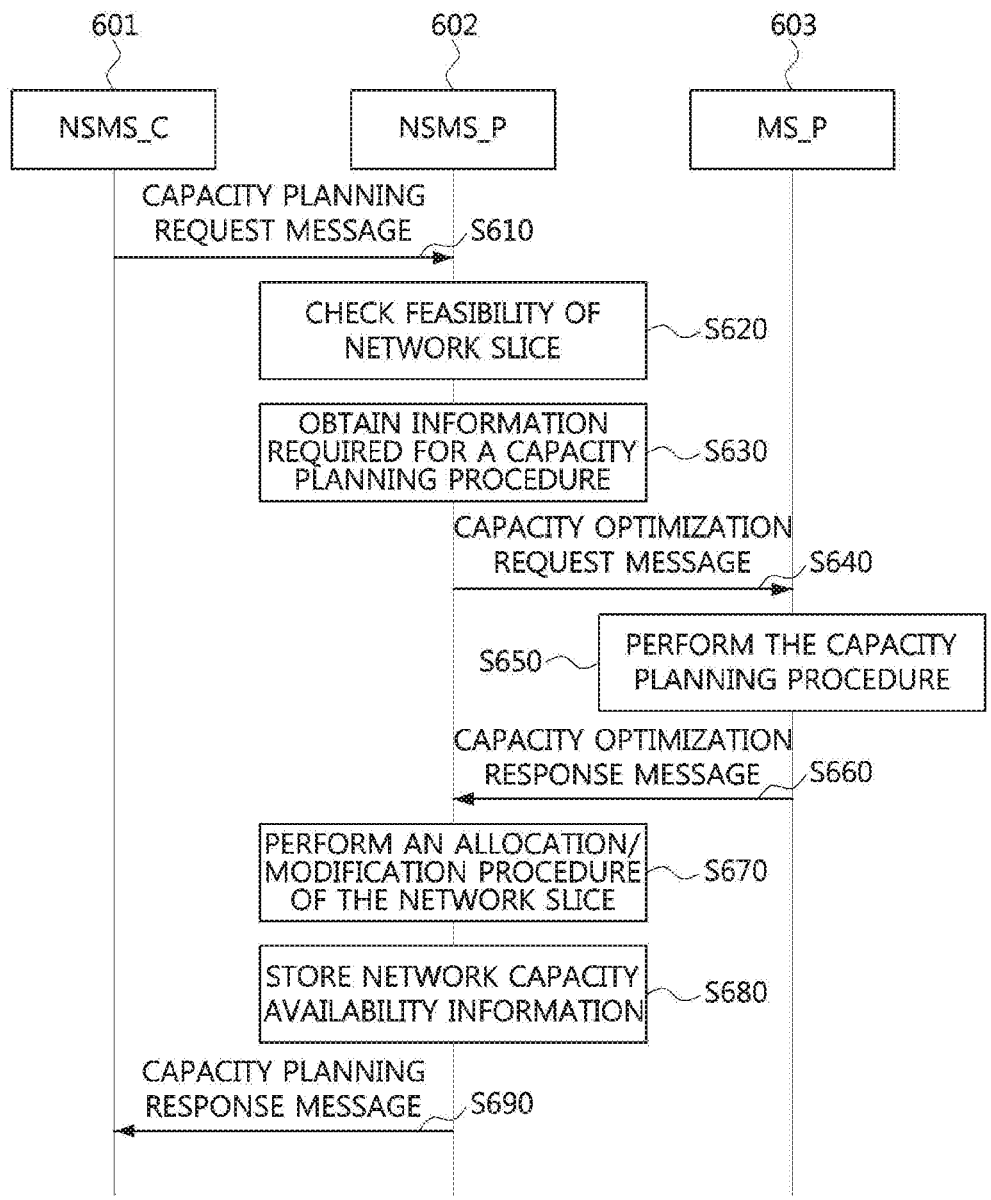
FIG. 6 is a sequence chart illustrating a first embodiment of a capacity planning method of a network slice (e.g., NSI and NSSI) in a communication system.

FIG. 6 is a sequence chart illustrating a first embodiment of a capacity planning method of a network slice (e.g., NSI and NSSI) in a communication system.

Referring to FIG. 6, a communication system may comprise a network slice management service consumer (NSMS_C) 601, a network slice management service provider (NSMS_P) 602, and a management service provider (MS_P) 603. The NSMS_C 601 may be a device operating as the NSMS_C, and may support one or more network functions shown in FIG. 1. The NSMS_C 601 may be a consumer of a network slice service. Alternatively, the NSMS_C 601 may be a provider of a network slice service. For example, the NSMS_C 601 may provide a service corresponding to the network slice to a user (e.g., UE) by using the network slice (e.g., NSI and NSSI) configured by the NSMS_P 602.

The NSMS_P 602 may be a device operating as the NSMS_P and may support one or more network functions as shown in FIG. 1. The NSMS_P 602 may support an NSI (re)allocation function, an NSI modification function, an NSSI (re)allocation function, and an NSSI modification function. The MS_P 603 may be a device operating as the MS_P and may support one or more network functions shown in FIG. 1. Also, the MS_P 603 may support a capacity planning function. For example, the MS_P 603 may be an NSMS_P supporting the capacity planning function among a plurality of NSMS_Ps. The capacity planning function may mean a function to optimize utilization of network resources and functions constituting the NSI or NSSI.

When capacity planning for the NSI or the NSSI configured for the NSMS_C 601 is required, the NSMS_C 601 may generate a capacity planning request message requesting to perform a capacity planning procedure, and transmit the generated capacity planning request message to the NSMS_P 602 (S610). That is, the capacity planning request message may be transmitted when optimization of network resource and function utilization of the NSMS_C 601 is required.

The capacity planning request message may include an indicator requesting to perform the capacity planning procedure, an identifier of the NSMS_C 601, an identifier of the network slice assigned to the NSMS_C 601 (e.g., NSI ID, NSSI ID), and an identifier of a target network to which the NSMS_C 601 belongs. The capacity planning request message may be transmitted from the NSMS_C 601 to the NSMS_P 602 when a predefined event occurs. Alternatively, the capacity planning request message may be transmitted according to a predetermined cycle. Here, the NSMS_P 602 may be the NSMS_P that assigns the NSI or the NSSI to the NSMS_C 601.

The NSMS_P 602 may receive the capacity planning request message from the NSMS_C 601 and confirm that the capacity planning procedure is requested to be performed based on the received capacity planning request message. In this case, the NSMS_P 602 may check feasibilities of all NSIs or all NSSIs of the target network (S620). The target network may be a network in which the NSI or NSSI configured for the NSMS_C 601 is located. All the NSIs may include at least one activated NSI and inactive NSIs, and all the NSSIs may include at least one activated NSI and inactive NSSIs. For example, the NSMS_P 602 may identify all the NSIs or all the NSSIs provisioned within the target network, and check the feasibilities of the identified NSIs or NSSIs. The NSMS_P 602 may output feasibility check results for the NSIs or the NSSIs. The feasibility check results (i.e., the result of the step S620) may be used as input parameters of the capacity planning procedure.

The NSMS_P 602 may obtain information required for the capacity planning procedure (S630). The required information may be information needed for resource optimization calculations in the target network. For example, the NSMS_P 602 may obtain information on network resources and functions used in the target network. Here, the information on the network resources and functions may include topology of the target network, capacity used in links of the target network, available capacity for the links of the target network, throughput, packet loss rate, link delay, and the like. Also, the NSMS_P 602 may obtain information on network resources and functions for all NSIs or all NSSIs in the target network. Here, the information on the network resources and functions may include network topologies, used capacities in links, available capacities for the links, throughputs, packet loss rate, link delays, and the like of the NSIs or the NSSIs. The NSMS_P 602 may output the information obtained in the step S630. The result of the step S630 may be used as input parameters of the capacity planning procedure.

The NSMS_P 602 may generate a capacity optimization request message including the result of the step S620 (e.g., the feasibility of the network slice) and the result of the step S630 (e.g., the information required for the capacity planning procedure) request message, and may transmit the capacity optimization request message to the MS_P 603 (S640). The capacity optimization request message may include an indicator instructing to perform the capacity planning procedure. The MS_P 603 may be an entity that performs the capacity planning function (e.g., a function of optimizing the network resources), and may be an entity independent of the NSMS_P 602. Alternatively, the MS_P 603 may be an entity included in the NSMS_P 602.

The MS_P 603 may receive the capacity optimization request message from the NSMS_P 602, and may identify the information included in the capacity optimization request message. The MS_P 603 may perform the capacity planning procedure using the information included in the capacity optimization request message (S650). The capacity planning procedure may be performed based on a predefined algorithm. When it is determined that relocation of an existing NSI or an existing NSSI is required in the capacity planning procedure, the MS_P 603 may determine the relocation of the NSI or the NSSI to be required.

Also, when it is determined that scale up or scale down of the existing NSI is required in the capacity planning procedure, the MS_P 603 may determine modification of the existing NSI to be required. When it is determined that scale up or scale down of the existing NSSI is required in the capacity planning procedure, the MS_P 603 may determine modification of the existing NSSI to be required.

The MS_P 603 may generate a capacity optimization response message including information indicating the result of the capacity planning procedure. The information indicating the result of the capacity planning procedure may be defined as shown in Table 1.

TABLE 1

| | Description |
|---|---|
| 00 | Allocation of NSI is required |
| 01 | Allocation of NSSI is required |
| 10 | Modification of NSI is required |
| 11 | Modification of NSSI is required |

When the modification of the existing NSI is required, the capacity optimization response message may further include information indicating that scale-up or scaling down of the existing NSI is required. When the modification of the existing NSSI is required, the capacity optimization response message may further include information indicating that scale-up or scaling down of the existing NSSI is required.

The MS_P 603 may transmit the capacity optimization response message to the NSMS_P 602 (S660). The NSMS_P 602 may receive the capacity optimization response message from the MS_P 603, and perform a network slice allocation/modification procedure (e.g., at least one of an NSI allocation procedure, an NSSI allocation procedure, an NSI modification procedure, and an NSSI modification procedure) based on the information included in the capacity optimization response message (S670). The network slice allocation/modification procedure may be repeatedly performed until the result indicated by the capacity optimization response message is satisfied. Here, the NSI allocation procedure may be performed as follows.

Figure 7:
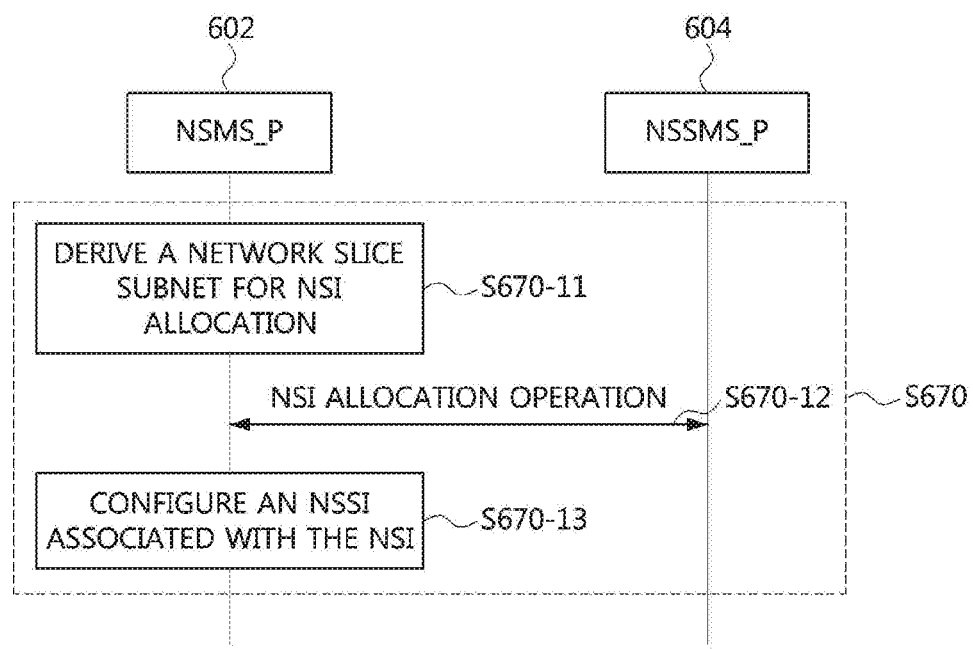
FIG. 7 is a sequence chart illustrating a first embodiment of an NSI allocation procedure in a communication system.

FIG. 7 is a sequence chart illustrating a first embodiment of an NSI allocation procedure in a communication system.

Referring to FIG. 7, an NSI allocation procedure may be performed by the NSMS_P 602 and a network service subnet management service provider (NSSMS_P) 604. The NSSMS_P 604 may be a device operating as the NSSMS_P and may support one or more network functions shown in FIG. 1.

When the capacity optimization response message received from the MS_P 603 instructs to perform the NSI allocation procedure, the NSMS_P 602 may derive a network slice subnet associated with requirements for the NSI allocation (S670-11). The NSMS_P 602 may perform an NSI allocation operation with the NSSMS_P 604 using the derived network slice subnet (S670-12). Then, an NSI may be generated as a result of the step S670-12, and the NSMS_P 602 may configure an NSSI associated with the NSI generated in the step S670-12 (S670-13). The steps S670-11 to S670-13 described above may be repeatedly performed until the result indicated by the capacity optimization response message is satisfied.

Meanwhile, the NSSI allocation procedure may be performed as follows.

Figure 8:
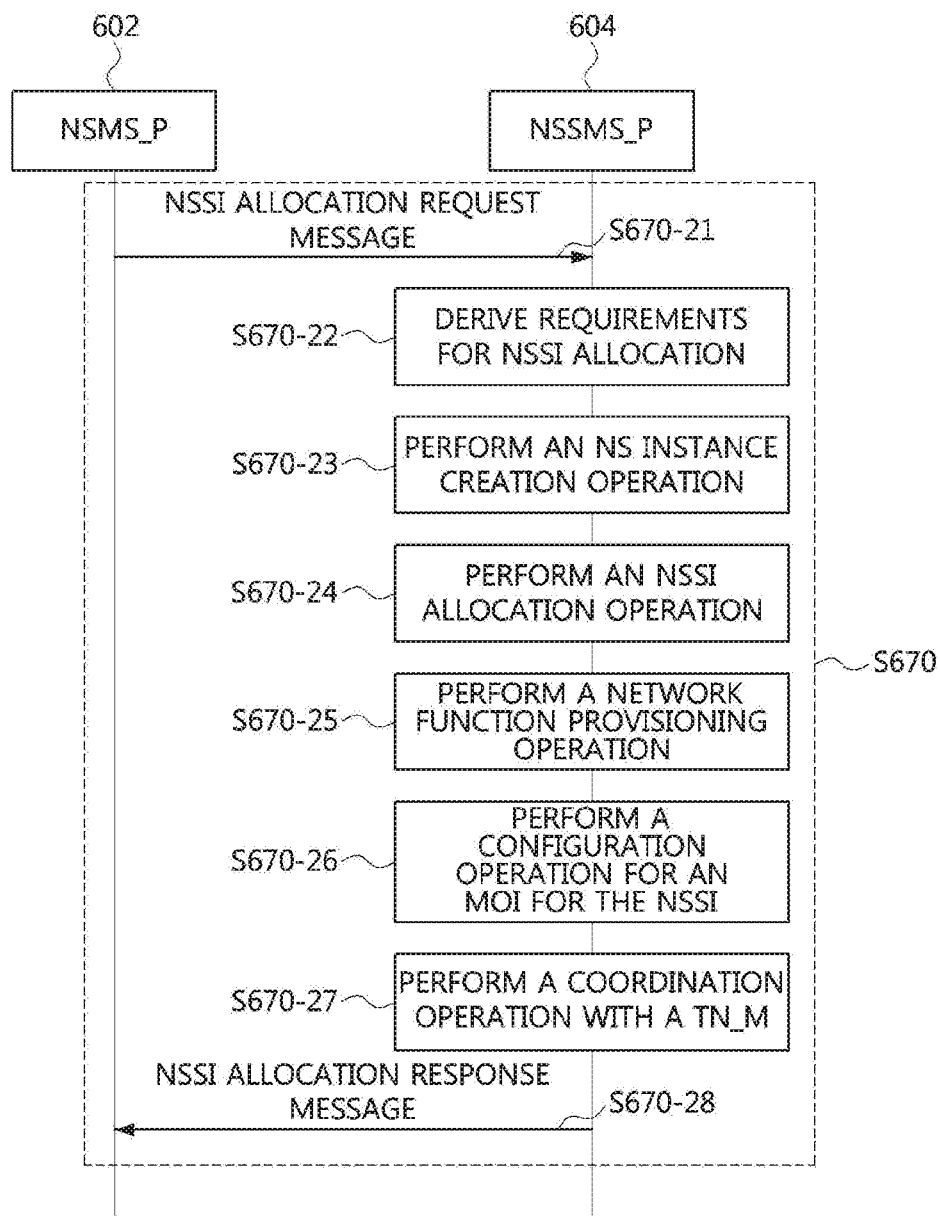
FIG. 8 is a sequence chart illustrating a first embodiment of an NSSI allocation procedure in a communication system.

FIG. 8 is a sequence chart illustrating a first embodiment of an NSSI allocation procedure in a communication system.

Referring to FIG. 8, an NSSI allocation procedure may be performed by the NSMS_P 602 and the NSSMS_P 604. The NSSMS_P 604 may be a device operating as the NSSMS_P and may support one or more network functions shown in FIG. 1.

When the capacity optimization response message received from the MS_P 603 instructs to perform the NSSI allocation procedure, the NSMS_P 602 may transmit an NSSI allocation request message to the NSSMS_P 604 (S670-21). When the NSSI allocation request message is received from the NSMS_P 602, the NSSMS_P 604 may determine that the NSSI allocation procedure is requested to be performed. Accordingly, the NSSMS_P 604 may derive requirements for NSSI components and a transport network (S670-22). The NSSMS_P 604 may perform the following steps based on the derived requirements. For example, if the NSSI includes a virtualization part, the NSSMS_P 604 may perform a network slice (NS) instance creation operation (S670-23).

Alternatively, according to the requirements of the NSSI components, the NSSMS_P 604 may perform the NSSI allocation operation (S670-24) and perform a provisioning operation of the network function (S670-25). Then, the NSSMS_P 604 may perform an operation of configuring an MOI for the NSSI (S670-26). Alternatively, according to the requirements of the transport network, the NSSMS_P 604 may perform a coordination operation with a transport network manager (TN_M) (S670-27).

The NSSMS_P 604 may generate an NSSI allocation response message including information on the configured NSSI, and may transmit the generated NSSI allocation response message to the NSMS_P 602 (S670-28). The NSMS_P 602 may receive the NSSI allocation response message from the NSSMS_P 604, and may identify the information on the NSSI included in the NSSI allocation response message. The steps S670-21 to S670-28 described above may be repeatedly performed until the result indicated by the capacity optimization response message is satisfied.

On the other hand, when the capacity optimization response message received from the MS_P 603 instructs to perform the NSI modification procedure, the NSMS_P 602 may perform the NSI modification procedure. The NSI modification procedure may be repeatedly performed until the result indicated by the capacity optimization response message is satisfied.

Meanwhile, the NSSI modification procedure may be performed as follows.

Figure 9:
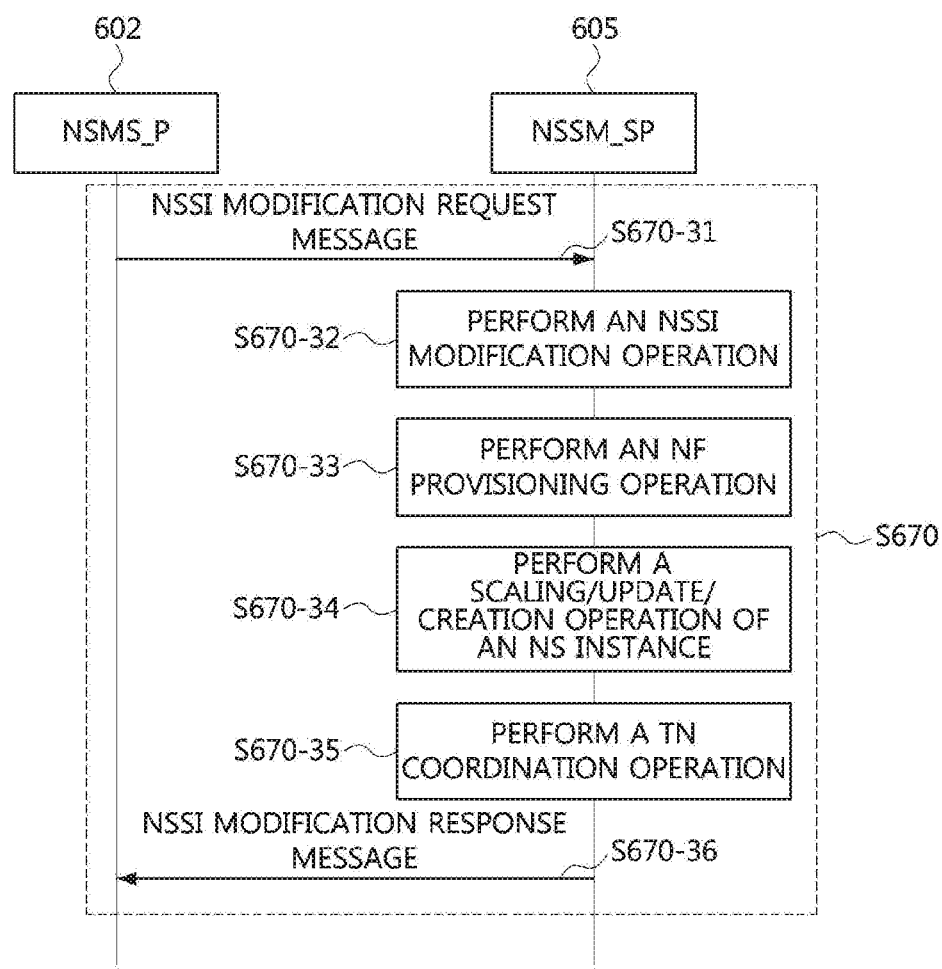
FIG. 9 is a sequence chart illustrating a first embodiment of an NSSI modification procedure in a communication system.

FIG. 9 is a sequence chart illustrating a first embodiment of an NSSI modification procedure in a communication system.

Referring to FIG. 9, an NSSI allocation procedure may be performed by the NSMS_P 602 and an NSSM_SP 605. The NSSM_SP 605 may be a device operating as the NSSM_SP, and may support one or more network functions (e.g., a network slice subnet management function (NSSMF)) shown in FIG. 1.

When the capacity optimization response message received from the MS_P 603 instructs to perform the NSSI modification procedure, the NSMS_P 602 may transmit an NSSI modification request message to the NSSM_SP 605 (S670-31). When the NSSI modification request message is received from the NSMS_P 602, the NSSM_SP 605 may determine that the NSSI modification procedure is requested to be performed. In this case, the NSSM_SP 605 may perform the following steps.

When the NSSI includes components for the NSSI, the NSSM_SP 605 may perform an NSSI modification operation (S670-32). When the NSSI includes an NH, the NSSM_SP 605 may perform an NF provisioning operation (S670-33). When the NSSI includes a virtualized part, the NSSM_SP 605 may perform a scaling, update or creation operation of an NS instance (S670-34). When the NSSI includes a TN part, the NSSM_SP 605 may perform a coordination operation related to the TN (S670-35).

When the NSSI modification is completed, the NSSM_SP 605 may generate an NSSI modification response message including information on the modified NSSI, and may transmit the generated NSSI modification response message to the NSMS_P 602 (S670-36). The NSMS_P 602 may receive the NSSI modification response message from the NSSM_SP 605 and may identify the information on the NSSI included in the NSSI modification response message. The steps S670-31 to S670-36 described above may be repeatedly performed until the result indicated by the capacity optimization response message is satisfied.

Referring again to FIG. 6, the NSMS_P 602 may store the result of the step S670 when the step S670 is completed (S680). For example, the NSMS_P 602 may update network capacity availability information that is the result of performing the step S670, and store the updated network capacity availability information in a repository in a management system of the NSMS_P 602. Also, the NSMS_P 602 may generate a capacity planning response message including the result of the step S670, and may transmit the generated capacity planning response message to the NSMS_C 601 (S690). The capacity planning response message may include the updated network capacity availability information. Also, the capacity planning response message may further include at least one of information on the allocated NSI, information on the allocated NSSI, information on the modified NSI, and information on the modified NSSI as the result of performing the step S670.

The NSMS_C 601 may receive the capacity planning response message from the NSMS_P 602, and may identify the information included in the capacity planning response message. Accordingly, the NSMS_C 601 may use the NSI or the NSSI indicated by the capacity planning response message. For example, the NSMS_C 601 may provide the network slice service to a user (e.g., UE) using the NSI or NSSI indicated by the capacity planning response message.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first device in a communication system supporting network slicing, the operation method comprising:
    configuring at least one network slice with network resources and functions of a core network (CN) and a radio access network (RAN);
    receiving a first message requesting capacity planning of a first network slice instance (NSI) among the at least one network slice from a second device;
    obtaining information required for the capacity planning;
    transmitting a second message including the required information to a third device supporting a function of the capacity planning;
    receiving a third message including a result of performing the capacity planning from the third device;
    performing a reallocation operation or a modification operation of the first NSI based on the result of performing the capacity planning;
    assigning the first NSI to user equipment (UE);
    assigning a second NSI to the UE; and
    sharing, by the first NSI and the second NSI, an access and mobility management function (AMF) of the communication system and a network slice selection function (NSSF) of the communication system, the AMF and the NSSF belonging to a common control plane of the communication system,
    wherein when the capacity planning is performed, network resources and functions constituting the first NSI configured with the network resources and functions of the CN and the RAN are optimized by operations including at least one of determining a relocation of the first NSI, or scaling up or scaling down of the first NSI.

2. The operation method according to claim 1, further comprising checking feasibility for the first NSI when the first message is received, wherein a result of checking the feasibility for the first NSI is included in the second message.

3. The operation method according to claim 1, further comprising:
    updating network capacity availability information based on a result of the reallocation operation or the modification operation of the first NSI; and
    transmitting a fourth message including the updated network capacity availability information to the second device.

4. The operation method according to claim 1, wherein the first NSI a network slice subnet instance (NSSI).

5. The operation method according to claim 4, wherein the result of performing the capacity planning includes at least one of an indicator requesting reallocation of the first NSI, an indicator requesting modification of the first NSI, an indicator requesting reallocation of the NSSI, and an indicator requesting modification of the NSSI.

6. The operation method according to claim 1, wherein the required information includes at least one of a topology, a capacity, a throughput, a packet loss rate, and a link delay of the first NSI.

7. The operation method according to claim 1, wherein the first device is a device operating as a network slice management service provider (NSMS_P), the second device is a device operating as a network slice management service consumer (NSMS_C), and the third device is a device operating as a management service provider (MS_P).

8. A first device in a communication system supporting network slicing, the first device comprising a first element supporting a network slice management slice (NSMS) function, a second element supporting a capacity planning function, and a memory storing at least one instruction executed by the first element and the second element, wherein the at least one instruction is configured to:
    configure at least one network slice with network resources and functions of a core network (CN) and a radio access network (RAN);
    receive, by the first element, a first message requesting the capacity planning of a first network slice instance (NSI) among the at least one network slice from a second device;
    obtain, by the first element, information required for the capacity planning;
    transmit, by the first element, a second message including the required information to the second element;
    perform, by the second element, the capacity planning for the first NSI based on the second message;
    transmit, by the second element, a third message including a result of performing the capacity planning to the first element;
    perform, by the first element, a reallocation operation or a modification operation of the first NSI based on the result of performing the capacity planning included in the third message;
    assign the first NSI to user equipment (UE);
    assign a second NSI to the UE; and
    share, by the first NSI and the second NSI, an access and mobility management function (AMF) of the communication system and a network slice selection function (NSSF) of the communication system, the AMF and the NSSF belonging to a common control plane of the communication system,
    wherein when the capacity planning is performed, network resources and functions constituting the first NSI configured with the network resources and functions of the CN and the RAN are optimized by operations including at least one of determining a relocation of the first NSI, or scaling up or scaling down of the first NSI.

9. The first device according to claim 8, wherein the at least one instruction is further configured to check, by the first element, feasibility for the first NSI when the first message is received, wherein a result of checking the feasibility for the first NSI is included in the second message.

10. The first device according to claim 8, wherein the at least one instruction is further configured to:
update, by the first element, network capacity availability information based on a result of the reallocation operation or the modification operation of the first NSI; and
transmit, by the first element, a fourth message including the updated network capacity availability information to the second device.

11. The first device according to claim 8, wherein the first NSI is a network slice subnet instance (NSSI).

12. The first device according to claim 11, wherein the result of performing the capacity planning includes at least one of an indicator requesting reallocation of the first NSI, an indicator requesting modification of the first NSI, an indicator requesting reallocation of the NSSI, and an indicator requesting modification of the NSSI.

13. The first device according to claim 8, wherein the required information includes at least one of a topology, a capacity, a throughput, a packet loss rate, and a link delay of the first NSI.

14. The first device according to claim 8, wherein the first device is a device operating as a network slice management service provider (NSMS_P), and the second device is a device operating as a network slice management service consumer (NSMS_C).

15. The operation method according to claim 1, further comprising:
by the NSSF,
selecting a target NSI based on at least one of a serving mobile virtual network operator (MVNO), an over-the-top (OTT) provider, a location of the UE, and a time window; and
supporting a slice-level service mapping operation for single-network slice selection assistance information (S-NSSAI).

* * * * *